United States Patent
Liu et al.

(10) Patent No.: US 12,155,084 B2
(45) Date of Patent: Nov. 26, 2024

(54) BATTERY CELL, COVER ASSEMBLY, BATTERY, ELECTRICITY-CONSUMING APPARATUS, METHOD AND DEVICE OF MANUFACTURING BATTERY CELL

(71) Applicant: CONTEMPORARY AMPEREX TECHNOLOGY (HONG KONG) LIMITED, Hong Kong (CN)

(72) Inventors: Yanyu Liu, Fujian (CN); Yulian Zheng, Fujian (CN); Xiaoxi Zhang, Fujian (CN); Shoujun Huang, Fujian (CN); Xinxiang Chen, Fujian (CN); Peng Wang, Fujian (CN)

(73) Assignee: CONTEMPORARY AMPEREX TECHNOLOGY (HONG KONG) LIMITED, Ningde (CN)

( * ) Notice: Subject to any disclaimer, the term of this patent is extended or adjusted under 35 U.S.C. 154(b) by 0 days.

(21) Appl. No.: 18/441,390

(22) Filed: Feb. 14, 2024

(65) Prior Publication Data

US 2024/0186646 A1    Jun. 6, 2024

Related U.S. Application Data

(63) Continuation of application No. PCT/CN2021/138706, filed on Dec. 16, 2021.

(51) Int. Cl.
*H01M 50/342* (2021.01)
*H01M 50/186* (2021.01)
(Continued)

(52) U.S. Cl.
CPC ..... *H01M 50/3425* (2021.01); *H01M 50/186* (2021.01); *H01M 50/367* (2021.01); *H01M 50/147* (2021.01); *H01M 2220/20* (2013.01)

(58) Field of Classification Search
CPC .......... H01M 50/3425; H01M 50/186; H01M 50/367; H01M 50/147
See application file for complete search history.

(56) References Cited

U.S. PATENT DOCUMENTS

| | | | |
|---|---|---|---|
| 6,521,024 B1* | 2/2003 | Akahori | ............ H01M 50/3425 96/6 |
| 2017/0271092 A1 | 9/2017 | Ishii et al. | |
| 2021/0043901 A1* | 2/2021 | Li | ....................... H01M 50/358 |

FOREIGN PATENT DOCUMENTS

| CN | 207800731 U | 8/2018 |
|---|---|---|
| CN | 208507798 U | 2/2019 |

(Continued)

OTHER PUBLICATIONS

CN 110429214 English Translation (Year: 2019).*

(Continued)

*Primary Examiner* — Jimmy Vo
(74) *Attorney, Agent, or Firm* — XSENSUS LLP

(57) ABSTRACT

A battery cell, a cover assembly, a battery, an electricity-consuming apparatus, a method and a device of manufacturing the battery cell are provided by the present application. The battery cell includes an electrode assembly; a casing accommodating the electrode assembly, in which the casing includes a wall portion, the wall portion includes a stepped hole, the stepped hole includes a first hole segment, a second hole segment and a first stepped face; a sealing member, in which a first sealing interface is formed between the sealing member and the first stepped face, the first sealing interface surrounds the first hole segment, and the sealing member includes a ventilating hole communicating with the first hole segment; a gas-ventilating film including a body and a convex portion, in which the body covers the (Continued)

ventilating hole, a second sealing interface is formed between the body and the sealing member.

18 Claims, 7 Drawing Sheets

(51) Int. Cl.
    *H01M 50/367*     (2021.01)
    *H01M 50/147*     (2021.01)

(56) References Cited

FOREIGN PATENT DOCUMENTS

| | | | | |
|---|---|---|---|---|
| CN | 110391367 A | | 10/2019 | |
| CN | 110429214 A | * | 11/2019 | ........ H01M 10/0413 |
| CN | 210136896 U | | 3/2020 | |
| CN | 211907557 U | | 11/2020 | |
| CN | 213483850 U | | 6/2021 | |
| CN | 213546446 U | | 6/2021 | |
| CN | 213717020 U | | 7/2021 | |
| JP | 2006-125559 A | | 5/2006 | |
| WO | 2022/252108 A1 | | 12/2022 | |

OTHER PUBLICATIONS

International Search Report and Written Opinion mailed on Sep. 14, 2022, received for PCT Application PCT/CN2021/138706, filed on Dec. 16, 2021, 15 pages including English Translation.

* cited by examiner

BATTERY CELL, COVER ASSEMBLY, BATTERY, ELECTRICITY-CONSUMING APPARATUS, METHOD AND DEVICE OF MANUFACTURING BATTERY CELL

CROSS-REFERENCE TO RELATED APPLICATION

This application is a Continuation of International Application No. PCT/CN2021/138706, filed on Dec. 16, 2021, titled "BATTERY CELL, COVER ASSEMBLY, BATTERY, ELECTRICITY-CONSUMING APPARATUS, METHOD AND DEVICE OF MANUFACTURING BATTERY CELL", which is hereby incorporated by reference in its entirety.

TECHNICAL FIELD

The present application relates to the technical field of battery, and in particular to a battery cell, a cover assembly, a battery, an electricity-consuming apparatus, a method and a device of manufacturing the battery cell.

BACKGROUND

Due to the advantages of high energy density, high power density, high cycle times, and long storage time of a rechargeable battery cell, the rechargeable battery cell has been widely used in an electric vehicle. At present, the gas-exhausting safety of the battery cell restricts the development of the battery cell, so the related technical research on the safety performance of the battery cell has become one of the research topics.

SUMMARY

A battery cell, a cover assembly, a battery, an electricity-consuming apparatus, a method and a device of manufacturing the battery cell are provided by the present application. The present application can alleviate the battery safety problem caused by exhausting gas.

In a first aspect, the battery cell provided by the present application includes: an electrode assembly; a casing, accommodating the electrode assembly, in which the casing includes a wall portion, the wall portion includes a stepped hole, the stepped hole penetrates through the wall portion in a thickness direction, the stepped hole includes a first hole segment, a second hole segment and a first stepped face, the first hole segment is closer to the electrode assembly than the second hole segment, and the first stepped face is configured to connect a hole wall of the first hole segment and a hole wall of the second hole segment; a sealing member, in which a first sealing interface is formed between the sealing member and the first stepped face, the first sealing interface surrounds the first hole segment, and the sealing member includes a ventilating hole communicating with the first hole segment; a gas-ventilating film, including a body and a convex portion, in which the body covers the ventilating hole, a second sealing interface is formed between the body and the sealing member, the second sealing interface surrounds the ventilating hole, the convex portion is arranged at a side of the body facing the sealing member, and the convex portion is located between the hole wall of the second hole segment and the sealing member to restrict the gas-ventilating film moving in a radial direction of the second hole segment; and a fixing member, connected to the wall portion and configured to provide a pressure to the gas-ventilating film.

In the technical solution of an embodiment of the present application, the stepped hole can be formed on the wall portion, the stepped hole may include the first hole segment arranged close to the electrode assembly, the second hole segment and the stepped face connecting to the first hole segment and the second hole segment, the first hole segment and the first stepped face can be configured to accommodate at least a part of the sealing member, the first sealing interface can be formed between the sealing member and the first stepped face, and the first sealing interface can be arranged around the first hole segment, so that it can ensure the sealing performance between the sealing member and the wall portion. The ventilating hole communicated with the first hole segment provided on the sealing member can guide the gas at an inside of the battery cell to the inside of the stepped hole, so as to discharge the gas to an outside of the casing.

The gas-ventilating film may include a body and a convex portion, and the body covers the ventilating hole, so that the gas entering through the ventilating hole can be discharged to the outside of the battery cell via the gas-ventilating film, the gas-ventilating film can block the leakage of an electrolyte, and at the same time it can prevent external water vapor from entering the battery cell and affecting the performance of the battery cell. The second sealing interface can be formed between the body and the sealing member, and the second sealing interface can surround the ventilating hole. According to the above arrangement, the gas-exhausting effect can be ensured, and at the same time, it can prevent the electrolyte from entering the outside of the body through a bonding region between the sealing member and the body, which may cause the gas-ventilating film to be soaked and swelled. The convex portion can be arranged correspondingly. Since the convex portion can be arranged at the side of the body facing the sealing member, the convex portion can be located between the hole wall of the second hole segment and the sealing member to limit gas-ventilating film moving in the radial direction of the second hole segment. In other words, since the convex portion connected with the body can be arranged between the hole wall of the second hole segment and the sealing member, when the body moves in the radial direction, the body will drive the convex portion to move. The convex portion can be located between the hole wall of the second hole segment and the sealing member. When the convex portion moves in the radial direction, the convex portion will provide the position restriction, so as to restrain the convex portion from moving and restrain the body from moving in the radial direction, so that it can prevent the gas-ventilating film from bias moving during assembled or from moving in the radial direction when subjected to a large gas pressure deformation. The fixing member which is arranged correspondingly can press and hold the gas-ventilating film to maintain the sealing performance of the first sealing interface and the second sealing interface, can provide the gas-ventilating film with an acting force opposite to an effect direction of the gas pressure of the inside of the battery cell, can suppress the deformation of the gas-ventilating film, and can improve the safety performance of the battery cell at the same time.

In some embodiments, two or more convex portions are arranged to be apart from one another in a circumferential direction of the second hole segment. The number of convex portions may be multiple and arranged to be apart from one another in the circumferential direction of the second hole segment, so that it can ensure that the position restriction can be provided in a plurality of directions and reduce the probability of the gas-ventilating film moving in the radial direction of the second hole segment.

In some embodiments, two or more convex portion are uniformly distributed in the circumferential direction. Two or more convex portions are uniformly arranged in the circumferential direction, so that the gas-ventilating film can be positioningly restricted and uniformly stressed at all places in the circumferential direction when the battery cell is assembled and formed and when the gas pressure of the inside of the battery cell is too high, so as to avoid the gas-ventilating film from moving in the radial direction due to uneven forces.

In some embodiments, the convex portion is an annular structure continuously extending in a circumferential direction of the second hole segment. Therefore, it can not only meet the positioning of the overall gas-ventilating film during assembly, but also reduce the probability of the gas-ventilating film moving in the radial direction, so as to ensure the assembly accuracy and ensure the safety performance of exhausting gas.

In some embodiments, the body is a sheet structure with a uniform thickness. According to the above arrangement, the gas-ventilating performance of the body can be ensured, and at the same time, the gas-ventilating performance of all parts of the body can be ensured to be consistent, so as to avoid deformation problems caused by the uneven forces.

In some embodiments, a first gap is formed between the convex portion and the first stepped face in the thickness direction. According to the above arrangement, the processing error generated during the processing of the gas-ventilating film can be compensated, and the requirements of positioning and assembly can be met.

In some embodiments, a second gap is formed between the convex portion and the sealing member in the radial direction of the second hole segment. According to the above arrangement, it can be ensured that the sealing member has a sufficient compression space, so as to ensure the sealing performance of the first sealing interface.

In some embodiments, an outer surface of the convex portion facing an inner wall of the second hole segment is a sloping face in the radial direction, and a distance between the outer surface and the inner wall in the radial direction gradually increases from a side of the outer surface away from the sealing member to a side at which the sealing member is located. According to the above arrangement, not only is it beneficial for assembly and positioning when the battery cell is assembled and formed, but also the conical arrangement of the outer surface of the convex portion facing the inner wall of the second hole segment facilitates the convex portion inserted and engaged between the inner wall of the second hole segment and the sealing member, so as to ensure the assembly efficiency.

In some embodiments, the body and the convex portion are of an integrally formed structure. According to the above arrangement, it can not only improve the production efficiency of the gas-ventilating film, but also ensure the connection strength between the convex portion and the body.

In some embodiments, the gas-ventilating film is entirely accommodated in the second hole segment. According to the above arrangement, it can ensure the pressure provided by the fixing member to the gas-ventilating film, and ensure the sealing performance of the first sealing interface and the second sealing interface. At the same time, at least part of a surface of the fixing member facing the gas-ventilating film can be pressed against a casing body, so as to facilitate the connection and positioning between the fixing member and the casing body.

In some embodiments, the first sealing interface at least partially overlaps with the second sealing interface in the thickness direction. According to the above arrangement, the sealing performance of the first sealing interface and the second sealing interface can be ensured, so that the sealing performance of the battery cell can be good and the safety performance can be high.

In some embodiments, the gas-ventilating film is configured to activate to open the ventilating hole and release an internal pressure of the battery cell when the internal pressure or a temperature of the battery cell reaches a threshold value. In other words, the ventilating hole can be communicated with the outside of the battery cell when the pressure or temperature of the inside of the battery cell reaches the threshold value, so as to exhaust the gas at the inside of the battery cell to the outside of the battery cell, thereby avoiding the risk of damage to the battery cell or even explosion caused by the pressure or temperature of inside of the battery being too high.

In some embodiments, the gas-ventilating film includes a polymer material. According to the above arrangement, it is beneficial to form the body and the convex portion, and at the same time it can ensure the gas-ventilating performance and the water-resisting performance.

In some embodiments, the stepped hole further includes a third hole segment and a second stepped face, the second hole segment is located between the third hole segment and the first hole segment, at least a part of the fixing member is accommodated in the third hole segment, and a part of the fixing member exceeding the hole wall of the second hole segment is pressed against the second stepped face. According to arranging the third hole segment and the second stepped face and defining the position and matching relationship among the third hole segment, the second stepped face and the fixing member, it is beneficial to the positioning assembly of the fixing member and the connection between the fixing member and the casing. At the same time, it can reduce the space of a module occupied by the fixing member, so that it is beneficial to improve the energy density of the battery cell.

In some embodiments, the fixing member is integrally accommodated in the third hole segment. According to the above arrangement, it can ensure non-interference with the module structure, therefore the space of the module is not occupied, and it is beneficial to improve the energy density.

In some embodiments, the casing may include the casing body and a cover assembly, the casing body includes an opening, the electrode assembly is arranged in the casing body, the cover assembly closes the opening, and one of the casing body and the cover assembly includes the wall portion. The casing body may include the wall portion, or the cover assembly may include the wall portion. When the cover assembly includes a wall portion, the cover assembly can be used as a part of the battery cell, or can be produced and sold as an independent component.

In some embodiments, the wall portion includes a base body and a connecting member, the base body includes a through hole penetrating in the thickness direction, the connecting member is accommodated in the through hole and connected to the base body, the connecting member includes the stepped hole, and each of the sealing member, the gas-ventilating film and the fixing member is arranged on the connecting member. The wall portion includes the base body and the connecting member, so that it is beneficial that the sealing member, the gas-ventilating film and the fixing member are connected with the base body after integrally assembled with the connecting member. Another forming and assembly process can be provided, which can also meet the performance requirements of the battery cell.

In some embodiments, the wall portion is provided with a position-restricting groove engaged with the sealing member, the position-restricting groove is formed by concaving from the first stepped face towards a direction facing away from the gas-ventilating film, and the sealing member at least partly extends into the position-restricting groove and engages with the position-restricting groove. According to the above arrangement, the relative position between the sealing member and the wall portion can be restricted to prevent the sealing member from moving in the radial direction, thereby further ensuring the sealing performance, and at the same time reducing the probability of the gas-ventilating film moving in the radial direction.

In a second aspect, a cover assembly for the battery cell provided by the present application includes a cover plate, including a wall portion, in which the wall portion includes a stepped hole penetrating through the wall portion in a thickness direction, the stepped hole includes a first hole segment, a second hole segment and a first stepped face, the first hole segment is closer to the electrode assembly of the battery cell than the second hole segment, and the first stepped face is configured to connect a hole wall of the first hole segment and a hole wall of the second hole segment; a sealing member, in which a first sealing interface is formed between the sealing member and the first stepped face, the first sealing interface surrounds the first hole segment, and the sealing member includes a ventilating hole communicating with the first hole segment; a gas-ventilating film, including a body and a convex portion, in which the body covers the ventilating hole, a second sealing interface is formed between the body and the sealing member, the second sealing interface surrounds the ventilating hole, the convex portion is arranged at a side of the body facing the sealing member, and the convex portion is located between the hole wall of the second hole segment and the sealing member to restrict the gas-ventilating film moving in a radial direction of the second hole segment; and a fixing member, connected to the wall portion and configured to provide a pressure to the gas-ventilating film.

In a third aspect, a battery provided by the present application includes the battery cell as described above. The battery is configured to provide an electric energy.

In a fourth aspect, an electricity-consuming apparatus provided by the present application includes the battery as described above.

In a fifth aspect, a method of manufacturing a battery cell includes:

providing a casing body, including an opening;

providing an electrode assembly and installing the electrode assembly into the casing body; and providing a cover assembly, in which the cover assembly is connected to the casing body and closes the opening, and the cover assembly includes:

a cover plate, including a wall portion, in which the wall portion includes a stepped hole penetrating through the wall portion in a thickness direction, the stepped hole includes a first hole segment, a second hole segment and a first stepped face, the first hole segment is closer to the electrode assembly of the battery cell than the second hole segment, and the first stepped face is configured to connect a hole wall of the first hole segment and a hole wall of the second hole segment;

a sealing member, in which a first sealing interface is formed between the sealing member and the first stepped face, the first sealing interface surrounds the first hole segment, and the sealing member includes a ventilating hole communicating with the first hole segment;

a gas-ventilating film, including a body and a convex portion, in which the body covers the ventilating hole, a second sealing interface is formed between the body and the sealing member, the second sealing interface surrounds the ventilating hole, the convex portion is arranged at a side of the body facing the sealing member, and the convex portion is located between the hole wall of the second hole segment and the sealing member to restrict the gas-ventilating film moving in a radial direction of the second hole segment; and a fixing member, connected to the wall portion and configured to provide a pressure to the gas-ventilating film.

In a sixth aspect, a device of manufacturing a battery cell provided by the present application includes:

a first assembly apparatus, configured to provide a casing body including an opening;

a second assembly apparatus, configured to provide an electrode assembly and install the electrode assembly into the casing body; and a third assembly apparatus, configured to provide a cover assembly, in which the cover assembly is connected to the casing body and closes the opening, and the cover assembly includes: a cover plate, including a wall portion, in which the wall portion includes a stepped hole penetrating through the wall portion in a thickness direction, the stepped hole includes a first hole segment, a second hole segment and a first stepped face, the first hole segment is closer to the electrode assembly of the battery cell than the second hole segment, and the first stepped face is configured to connect a hole wall of the first hole segment and a hole wall of the second hole segment; a sealing member, in which a first sealing interface is formed between the sealing member and the first stepped face, the first sealing interface surrounds the first hole segment, and the sealing member includes a ventilating hole communicating with the first hole segment; a gas-ventilating film, including a body and a convex portion, in which the body covers the ventilating hole, a second sealing interface is formed between the body and the sealing member, the second sealing interface surrounds the ventilating hole, the convex portion is arranged at a side of the body facing the sealing member, and the convex portion is located between the hole wall of the second hole segment and the sealing member to restrict the gas-ventilating film moving in a radial direction of the second hole segment; and a fixing member, connected to the wall portion and configured to provide a pressure to the gas-ventilating film.

The above description is only an overview of the technical solution of the present application. In order to understand the technical means of the present application more clearly, it can be implemented according to the contents of the description. In addition, in order to make the above and other objects, features and advantages of the present application more obvious and understandable, the specific embodiments of the present application are enumerated below.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
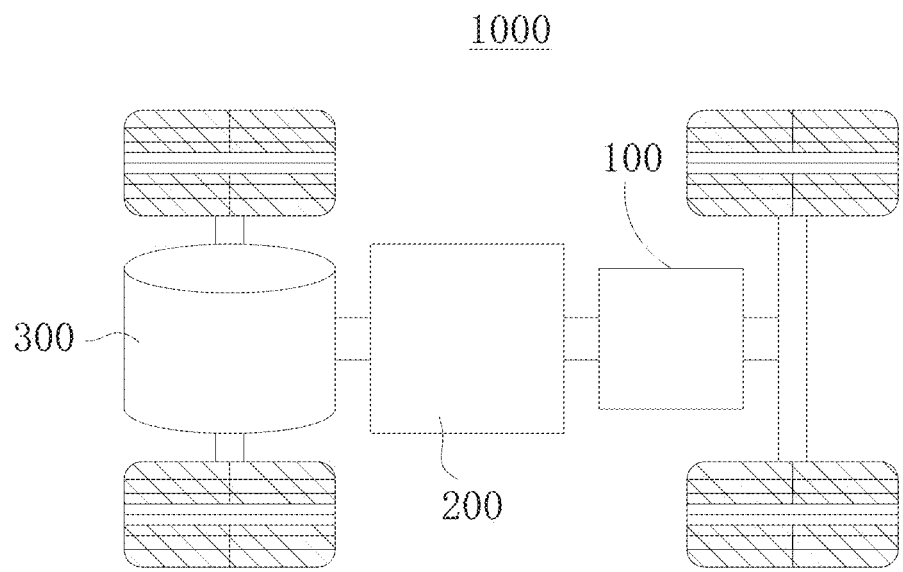
FIG. 1 shows a structural schematic view of a vehicle according to some embodiments of the present application.

The reference numerals in the specific embodiment are as follows:
1000—vehicle;
100—battery; 200—controller; 300—motor;
10—box body; 11—first portion; 12—second portion;
20—battery cell; 21—cover assembly; 21a—electrode terminal; 21b—cover plate; 22—casing body;
210—wall portion; 210a—base body; 210b—connecting member; 210c—through hole;
211—stepped hole; 2111—first hole segment; 2112—second hole segment; 2113—first stepped face; 2114—third hole segment; 2115—second stepped face; 2116—position-restricting groove;
220—sealing member; 221—ventilating hole; 222—first sealing body; 223—second sealing body; 224—sealing connecting body;
230—gas-ventilating film; 231—body; 232—convex portion;
240—fixing member;
250—first sealing interface; 260—second sealing interface;
270—first gap;
280—second gap;
23—electrode assembly; 23a—electrode tab; X—thickness direction; Y—radial direction; Z—circumferential direction.

In the drawings, the same portions are given the same reference numerals. The drawings are not drawn to actual scale.

DETAILED DESCRIPTION

Embodiments of the technical solutions of the present application will be described in detail below in conjunction with the drawings. The following examples are only used to illustrate the technical solution of the present application more clearly, and therefore are only examples, rather than restricting the protection scope of the present application.

Unless otherwise defined, technical terms or scientific terms used in the present application should be interpreted according to common meanings thereof as commonly understood by those of ordinary skills in the art. The terms used in the description in the present application are only for the purpose of describing specific embodiments and are not intended to limit the present application. The terms "including" and "having" in the description and the claims of the present application and the above description of the drawings, and any variations thereof are intended to cover non-exclusive inclusions.

In the description of the embodiments of the present application, technical terms such as "first" and "second" are only used to distinguish different objects, and should not be understood as indicating or implying relative importance or implicitly indicating the number, specificity or specificity of the indicated technical features. In the description of the embodiments of the present application, "plurality" means two or more, unless otherwise specifically defined.

The "embodiments" referred in the present application means that specific features, structures or characteristics described in conjunction with the embodiments may be included in at least one embodiment of the present application. This word appeared in various places in the description does not necessarily refer to the same embodiment, nor is it an independent or alternative embodiment mutually exclusive with other embodiments. It is understood explicitly and implicitly by those skilled in the art that the embodiments described herein can be combined with other embodiments.

In the description of the embodiments of the present application, the term "and/or" is merely an association relationship describing associated objects, which means that there can be three types of relationships. For example, "A and/or B" can mean three cases that there is only A, there are A and B at the same time, and there is only B. In addition, the punctuation mark "/" in the present application generally indicates that the related objects of the preceding content and following content are in an "or" relationship.

In the description of the embodiments of the present application, the term "plurality" refers to two or more (including two), similarly, "a plurality of groups" refers to two or more (including two) groups, and similarly, "a plurality of sheets" refers to two or more (including two) sheets.

In the description of the present application, the technical terms "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial" and "circumferential" and the like indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application.

In the description of the present application, unless otherwise clearly specified and limited, the technical terms "mount", "communicate", "connect", "fix" and the like should be understood in a broad sense, for example, it can be a fixed connection, a detachable connection, or an integral connection, it can be a mechanical connection, or an electrical connection, it can be a direct connection, or it can be connected indirectly through an intermediary, and it can be an internal communication of two elements or an interaction relationship between two elements. For those of ordinary skill in the art, the specific meaning of the above-mentioned terms in the present application can be understood according to specific situations.

At present, judging from the development of the market situation, the application of a power battery is becoming more and more extensive. The power battery is not only applied to a power source storage system such as a hydraulic power plant, a thermal power plant, a wind power plant, a solar power plant and the like, but also widely applied to an electric transportation tool such as an electric bicycle, an electric motorcycle, an electric vehicle and the like, as well as a military equipment and an aerospace and other fields. With the continuous expansion of the power battery application field, the market demand of the power battery application is also constantly expanding.

The inventors noticed that since the battery undergoes multiple charge and discharge cycles during using, there are side reactions in the battery. The battery continuously generates gas, so that there is a certain gas pressure at an inside of a battery cell. As the gas pressure increases, the gas among electrode sheets cannot be removed in time, so that it may affect the intercalation and extraction of lithium ions, and lead to the risk of lithium precipitation. Therefore, a gas-ventilating member can be arranged on a casing of the battery cell, and on the basis of the explosion-proof function, it can realize slow permeating and exhausting gas, thereby reducing the gas pressure of the inside of the battery cell and reducing the risk of lithium precipitation.

The inventors found that the gas-exhausting rate of the battery cell is directly proportional to a gas-ventilating area of the gas-ventilating member and inversely proportional to a gas-ventilating thickness of the gas-ventilating member. Due to the space restriction of the battery cell and the structural requirement of the module, the area of the gas-ventilating member needs to be reduced as much as possible. In order to ensure the gas-ventilating requirement, the thickness of the gas-ventilating member should be reduced accordingly. Thinning the thickness of the gas-ventilating member will affect the interface sealing and assembly. For example, the gas-ventilating member is prone to movement during the assembly process, that is, a radial direction of the gas-ventilating holes on the casing for gas discharge occurs movement. When the position movement is relatively far, it is easy to appear that an edge of the gas-ventilating film is relatively close to a hole wall of the gas-ventilating hole. When the gas pressure of the inside of the battery cell reaches a predetermined threshold, the gas will be discharged from the battery cell through the gas-ventilating member. The gas will act on the gas-ventilating member during the discharge process, thus, the gas-ventilating member is easily deformed, the venting member is easy to fall out of the gas-ventilating hole, and the potential safety hazards to the battery cell.

In order to alleviate the displacement of the gas-ventilating member during assembly and the displacement caused by the deformation of the battery cell under the action of the gas at the inside the battery cell, the applicant found that a convex portion can be arranged on the gas-ventilating member. The displacement of the gas-ventilating member can be limited by the convex portion, so as to alleviate the safety problem of the battery cell caused by exhausting gas.

Based on the above considerations, in order to alleviate the potential safety hazard caused by the displacement of the gas-ventilating member during using the battery cell, the inventor has designed a battery cell after an in-depth research. By providing the convex portion, the displacement of the gas-ventilation member can be restricted by the convex portion, so as to alleviate the safety problem of the battery cell caused by exhausting gas.

The battery cells disclosed in the embodiments of the present application can be used, but not limited to, in electric devices such as vehicles, ships or aircrafts. The power source system including the battery cell, the battery and the like disclosed in the present application can be used to form an electricity-consuming apparatus, so that it is beneficial to alleviate the displacement of the gas-ventilating member and improve the safety performance and service life of the battery.

The embodiments of the present application provide the electricity-consuming apparatus applying the battery as the power source. The electricity-consuming apparatus can be but not limited to a mobile phone, a tablet, a laptop, an electric toy, an electric tool, a battery car, an electric car, a ship, a spacecraft and the like. Herein, the electric toy can include a stationary electric toy or a mobile electric toy, such as a game console, an electric car toy, an electric boat toy, an electric airplane toy and the like, and the spacecraft can include an airplane, a rocket, a space shuttle, a spaceships and the like.

In the following embodiments, for the convenience of description, a vehicle 1000 as the electricity-consuming apparatus according to the embodiments of the present application is taken as an example for description.

Referring to FIG. 1, FIG. 1 shows a structural schematic view of the vehicle 1000 according to some embodiments of the present application. The vehicle 1000 can be a fuel vehicle, a gas vehicle or a new energy vehicle. The new energy vehicles can be a pure electric vehicle, a hybrid vehicle, an extended-range vehicle and the like. A battery 100 may be arranged at an inside of the vehicle 1000, and the battery 100 may be arranged at the bottom, the front or the back of the vehicle 1000. The battery 100 can be used to supply power to the vehicle 1000, for example, the battery 100 can be used as an operating power source of the vehicle 1000. The vehicle 1000 may further include a controller 200 and a motor 300, the controller 200 can be used to control the battery 100 to supply power to the motor 300, for example, for starting, navigating and driving the vehicle 1000.

In some embodiments of the present application, the battery 100 can not only be used as an operating power source for the vehicle 1000, but can also be used as a driving power source for the vehicle 1000, replacing or partially replacing the fuel oil or the natural gas to provide driving power for the vehicle 1000.

Figure 2:
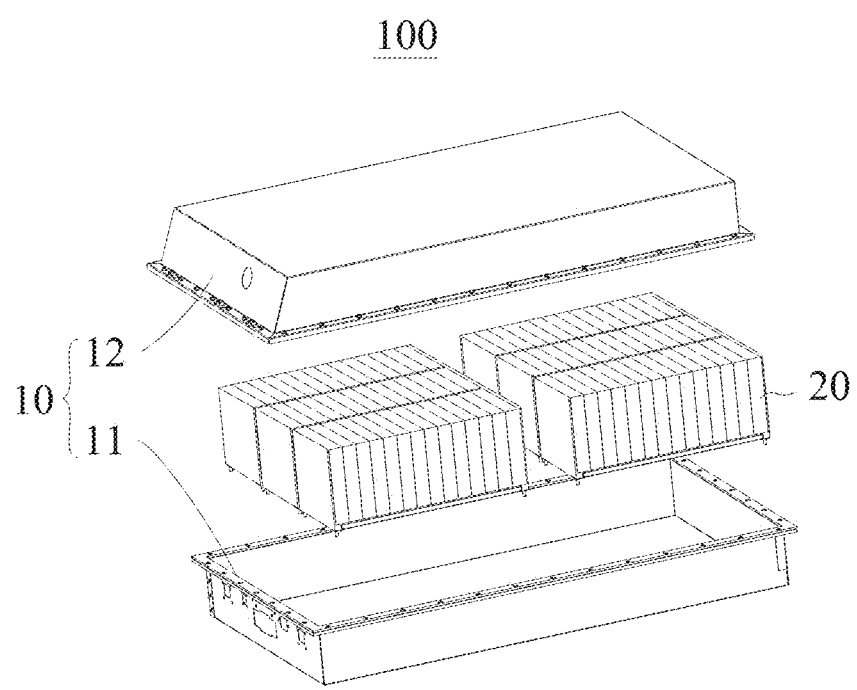
FIG. 2 shows an exploded schematic view of a battery according to some embodiments of the present application.

Referring to FIG. 2, FIG. 2 shows an exploded schematic view of the battery 100 according to some embodiments of the present application. The battery 100 includes a box body 10 and a battery cell 20, and the box body 10 is configured to accommodate the battery cell 20. Herein, the box body 10 provides an accommodating space for the battery cell 20, and the box body 10 can adopt various structures. In some embodiments, the box body 10 may include a first portion 11 and a second portion 12. The first portion 11 and the second portion 12 may cover with each other, and the first portion 11 and the second portion 12 jointly define the accommodating space for accommodating the battery cell 20. The second portion 12 can be a hollow structure having an opening at an end, the first portion 11 can be a plate-shaped structure, and the first portion 11 may cover a side of the second portion 12 with the opening so that the first portion 11 and the second portion 12 jointly define an accommodating space. Or each of the first portion 11 and the second portion 12 can be the hollow structure having the opening at a side, and the side of the first portion 11 with the opening covers and closes to the side of the second portion 12 with the opening. Of course, the box body 10 formed by the first portion 11 and the second portion 12 can be in various shapes, such as a cylinder, a cuboid and the like.

In the battery 100, there may be a plurality of battery cells 20. The plurality of battery cells 20 can be connected in series, in parallel or in mixed. The mixed connection means that the plurality of battery cells 20 may include the connection in series and the connection in parallel. The plurality of battery cells 20 can be directly connected in series, in parallel or in mixed together, and then the whole composed of the plurality of battery cells 20 can be accommodated in the box body 10. Certainly, the battery 100 may be in form of the plurality of battery cells 20 connected in series, in parallel or in mixed to form the battery module firstly, and then the plurality of battery modules are connected in series, in parallel or in mixed to form a whole, and accommodated in the box body 10. The battery 100 may also include other structures, for example, the battery 100 may also include a current-collecting portion for realizing electrical connection among the plurality of the battery cells 20.

Each of the battery cells 20 can be a secondary battery or a primary battery; the battery cell can also be a lithium-sulfur battery, a sodium-ion battery or a magnesium-ion battery, but is not restricted thereto. The battery cell 20 may be in the form of a cylinder, a flat body, a cuboid or other shapes.

Figure 3:
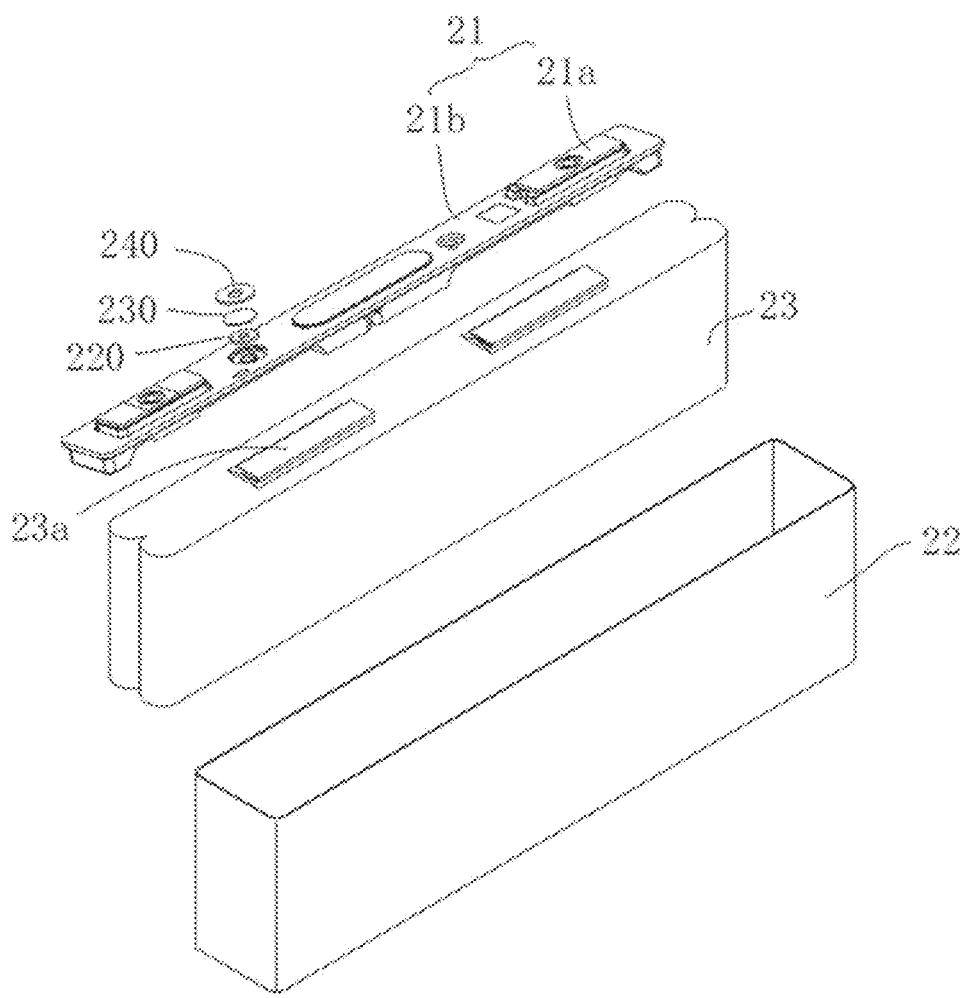
FIG. 3 shows an exploded structural schematic view of a battery cell according to some embodiments of the present application.
Figure 4:
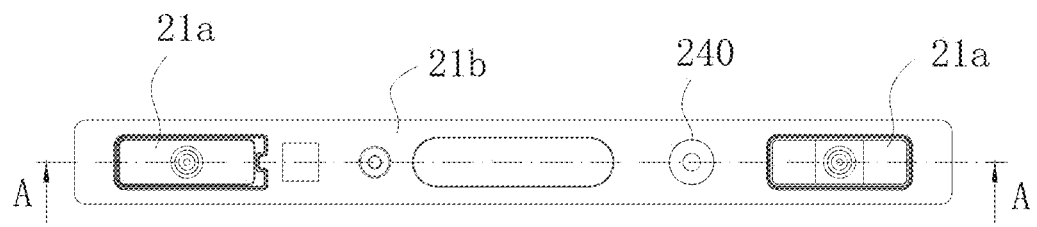
FIG. 4 shows a top view of a battery cell according to some embodiments of the present application.

Referring to FIG. 3, FIG. 3 shows an exploded structural schematic view of a battery cell according to some embodiments of the present application. The battery cell 20 refers to the smallest unit constituting the battery. As shown in FIG. 3, the battery cell 20 includes a cover assembly 21, a casing body 22, an electrode assembly 23 and other functional portions.

The cover assembly 21 refers to a portion that covers an opening of the casing body 22 to isolate an internal environment of the battery cell 20 from the external environment. Without limitation, the shape of the cover assembly 21 can be adapted to the shape of the casing body 22 to fit the casing body 22. Optionally, the cover assembly 21 may be made of a material with a certain hardness and strength, such as aluminum alloy. Thus, the cover assembly 21 is not easily deformed when being squeezed and collided, so that the battery cell 20 can have higher structural strength, and the safety performance can also be improved. The cover assembly 21 may include a functional portion such as an electrode terminal 21a, a cover plate 21b and the like. The electrode terminal 21a can be used to be electrically connected with the electrode assembly 23 for outputting or inputting the electric energy of the battery cell 20. In some embodiments, the cover assembly 21 may also be provided with a pressure-releasing mechanism for releasing the internal pressure when the pressure or temperature of inside of the battery cell 20 reaches a threshold value. The material of the cover assembly 21 may also be various, for example, a copper, an iron, an aluminum, a stainless steel, an aluminum alloy, a plastic or the like, which is not specifically restricted in the embodiments of the present application. In some embodiments, an insulating member can be provided at an inside of the cover assembly 21, and the insulating member can be used to isolate the electrode assembly 23 in the casing body 22 from the cover assembly 21 to reduce the risk of short circuit. Exemplarily, the insulating member 24 may be of plastic, rubber or the like.

The casing body 22 and the cover assembly 21 jointly form the casing of the battery cell 100. The casing body 22 may be a component for fitting the cover assembly 21 to form the internal environment of the battery cell 20. Herein, the internal environment which is formed can be used to accommodate the electrode assembly 23 as well as other portions. The casing body 22 and cover assembly 21 may be separate portions. An opening may be formed on the casing body 22. The internal environment of the battery cell 20 can be formed by the cover assembly 21 covering the opening. Without limitation, the cover assembly 21 and the casing body 22 may also be integrated. Specifically, the cover assembly 21 and the casing body 22 can form a common connecting face before other portions are inserted into the casing. When the inside of the casing body 22 needs to be packaged, the cover assembly 21 can be used to cover the casing body 22. The casing body 22 can be in various shapes and sizes, such as cuboid, cylinder, hexagonal prism and the like. Specifically, the shape of the casing body 22 can be determined according to the specific shape and the size of the electrode assembly 23. The casing body 22 can be made of various materials, such as copper, iron, aluminum, stainless steel, aluminum alloy, plastic and the like, which is not particularly restricted in the embodiments of the present application.

The electrode assembly 23 is a portion in which an electrochemical reaction occurs in the battery cell 100. One or more electrode assemblies 23 may be contained within the casing body 22. The electrode assembly 23 can be mainly formed by winding or stacking a positive electrode sheet and a negative electrode sheet, and a separating film can be usually provided between the positive electrode sheet and the negative electrode sheet. A part of the positive electrode sheet and the negative electrode sheet having an active material forms a main body of the electrode assembly. A part of the positive electrode sheet and the negative electrode sheet that do not have the active material form an electrode tab 231. A positive electrode tab and a negative electrode tab can be located at one end of the main body together or at two ends of the main body respectively. During the charging and discharging process of the battery, a positive electrode active material and a negative electrode active material react with an electrolyte, and the electrode tab 231 can be connected to the electrode terminal 21a to form a current loop.

Figure 5:
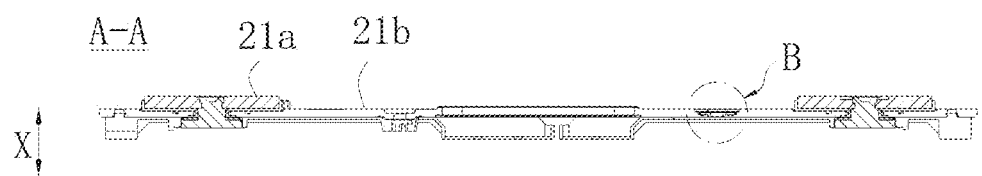
FIG. 5 shows a partial sectional view in an A-A direction in FIG. 4.
Figure 6:
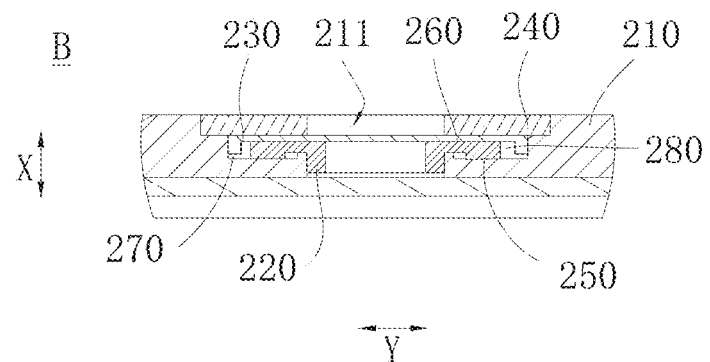
FIG. 6 shows an enlarged view at a B portion in FIG. 5.
Figure 7:
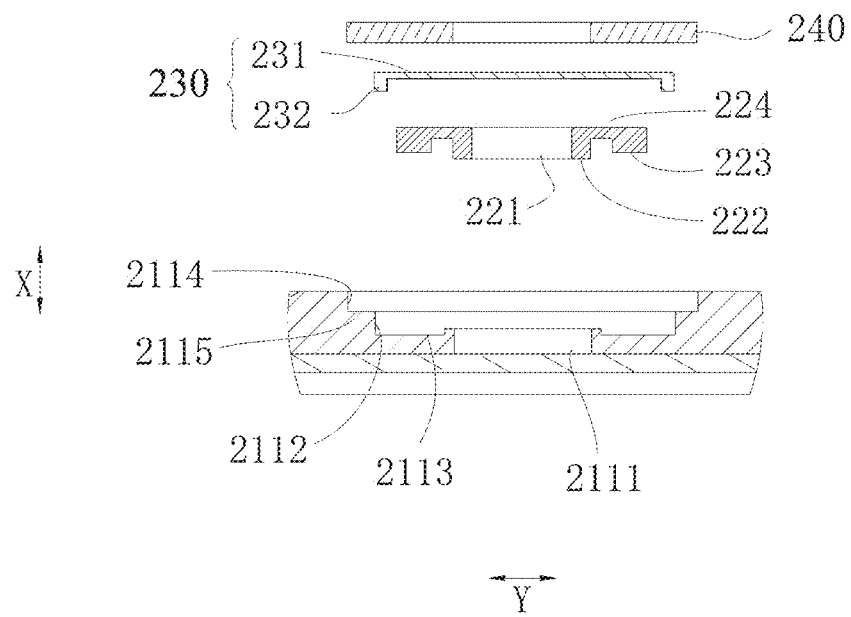
FIG. 7 shows an exploded structural schematic view of the structure as shown in FIG. 6.

According to some embodiments of the present application, referring to FIG. 3, and further referring to FIG. 4 to FIG. 7, FIG. 4 shows a top view of the battery cell 20 according to some embodiments of the present application; FIG. 5 shows a partial sectional view in an A-A direction in FIG. 4; FIG. 6 shows an enlarged view at a B portion in FIG. 5; and FIG. 7 shows an exploded structural schematic view of the structure as shown in FIG. 6.

The battery cell provided by the present application includes: the casing, the electrode assembly 23, a sealing member 220, a gas-ventilating film 230 and a fixing member 240. The casing is configured to accommodate the electrode assembly 23, the casing includes a wall portion 210, the wall portion includes a stepped hole 211, the stepped hole 211 penetrates through the wall portion 210 in a thickness direction X, the stepped hole 211 includes a first hole segment 2111, a second hole segment 2112 and a first stepped face 2113, the first hole segment 2111 is closer to the electrode assembly 23 than the second hole segment 2112, and the first stepped face 2113 is configured to connect a hole wall of the first hole segment 2111 and a hole wall of the second hole segment 2112. A first sealing interface 250 is formed between the sealing member 220 and the first stepped face 2113, the first sealing interface 250 surrounds the first hole segment 2111, and the sealing member 220 includes a ventilating hole 221 communicating with the first hole segment 2111. The gas-ventilating film 230 includes a body 231 and a convex portion 232, the body 231 covers the ventilating hole 221, a second sealing interface 260 is formed between the body 231 and the sealing member 220, the second sealing interface 260 surrounds the ventilating hole 221, the convex portion 232 is arranged at a side of the body 231 facing the sealing member 220, and the convex portion 232 is located between the hole wall of the second hole segment 2112 and the sealing member 220 to restrict the gas-ventilating film 230 moving in a radial direction of the second hole segment 2112. The fixing member 240 is connected to the wall portion 210 and configured to provide a pressure to the gas-ventilating film 230.

The casing includes the casing body 22 and the cover assembly 21, the casing body 22 includes an opening, the cover assembly 21 is arranged to close the opening, and the wall portion 210 of one of the casing body 22 and the cover assembly 21 includes the stepped hole 211. The wall portion 210 of the casing body 22 may include the stepped hole 211, or the wall portion 210 of the cover assembly 21 may include the stepped hole 211. The cover assembly 21 covers and closes the opening of the casing body 22 to form the internal environment of the battery cell for accommodating the electrode assembly 23. The wall portion 210 is a part of the side wall of the casing for enclosing and forming the internal environment.

The stepped hole 211 communicates the inside of the battery cell 100 with the outside of the battery cell 100. When the wall portion 210 is a part of the cover assembly 21, the thickness direction X of the wall portion 210 can be understood as the thickness direction X of the cover plate 21b. When the wall portion 210 is a part of the casing body 22, if the wall portion 210 is a side wall of the casing body 22, the thickness direction X of the wall portion 210 is the thickness direction X of the side wall of the casing body 22 at the corresponding position; if the wall portion 210 is a bottom wall of the casing body 22, it can be understood that the thickness direction X of the wall portion 210 is the thickness direction X of the bottom wall of the casing body 22 at the corresponding position.

A cross-sectional shape of the first hole segment 2111 and a cross-sectional shape of the second hole segment 2112 may be the same or different. The first hole segment 2111 is located at a side of the second hole segment 2112 close to the electrode assembly 23. A size of the first hole segment 2111 in a radial direction Y may be smaller than a size of the second hole segment 2112 in a radial direction Y. The first stepped surface 2113 is connected between the first hole segment 2111 and the second hole segment 2112.

The cross-sectional shape of the first hole segment 2111 and the cross-sectional shape of the second hole segment 2112 may be the same, but a cross-sectional size of the first hole segment 2111 may be different from a cross-sectional size of the second hole segment 2112. Certainly, the cross-sectional shape of the first hole segment 2111 may be different from the cross-sectional shape of the second hole segment 2112, and the cross-sectional size of the first hole segment 2111 may be different from the cross-sectional size of the second hole segment 2112.

The cross-sectional shape of the first hole segment 2111 may be circular, polygonal or the like, and the cross-sectional shape of the second hole segment 2112 may be circular, elliptical, polygonal or the like. A cross-sectional shape of the ventilating hole 221 may be circular, polygonal or the like. When the cross-sectional shapes are the polygon, such as a regular polygon, a circumferential direction Z, the radial direction Y and an axial direction of the first hole segment 2111, the second hole segment 2112, and the ventilating hole 221 are the circumferential direction Z, radial direction Y and axial direction of the respectively corresponding circumscribed circle or inscribed circle. When the cross-sectional shapes are not the polygon, a direction perpendicular to a plane where connecting lines of vertices of non-regular polygon are located may be the axial direction, a direction arranged around an axis extending in the axial direction may be the circumferential direction Z, and a direction perpendicular to the axial direction may be the radial direction.

A first sealing interface 250 is formed between the sealing member 220 and the first stepped surface 2113. The sealing member 220 at least partially presses against the first stepped surface 2113 and forms the first sealing interface 250 by contacting with the first stepped surface 2113. The first sealing interface 250 can be designed to be around the first hole segment 2111 in the circumferential direction Z of the ventilating hole 221, that is, the first sealing interface 250 is in a shape of annular and arranged around the first hole segment 2111.

The first stepped surface 2113 can be a plane, or of course can be a non-planar face, such as a stepped face or the like.

The sealing member 220 may be at least partially located in the first hole segment 2111 and the ventilating hole 221 may communicate with the first hole segment 2111, so as to guide the gas generated at the inside the battery cell 20 into the first hole segment 2111 through the ventilating hole 221.

The gas-ventilating member 230 has a ventilation function, and the material of the gas-ventilating member 230 can be PP (polypropylene, polypropylene), PE (polyethylene, polyethylene), and PU (polyurethane, polyurethane). The gas at the inside of the battery cell 20 needs to pass through the gas-ventilating member 230 when being exhausted. The gas-ventilating member 230 can allow the gas at the inside of the battery cell 20 to flow to the outside of the battery cell 20, and can block the water vapor at the outside of the battery cell 20 from entering the inside of the battery cell 20.

An orthographic projection of the body 231 of the gas-ventilating member 230 in the thickness direction X of the wall portion 210 covers the ventilating hole 221, that is, an area of the gas-ventilating member 230 is larger than an area of the ventilating hole 221. The gas-ventilating member 230 is arranged to protrude from the ventilating hole 221 in the radial direction Y of the ventilating hole 221. The protruding part is in contact with the sealing member 220 and forms a second sealing interface 260. The second sealing interface 260 is arranged around the ventilating hole 221 in the circumferential direction Z of the ventilating hole 221.

The convex portion 232 can be arranged at a side of the body 231 facing the sealing member 220. The convex portion 232 may protrude from the body 231 in the thickness direction X of the wall portion 210 or in the axial direction of the ventilating hole 221. The convex portion 232 may be a block-shaped convex portion, may be an arc-shaped convex portion, or of course may be a full-ring-shaped convex portion. The convex portion 232 may be inserted and engaged into a region between the sealing member 220 and the hole wall of the second hole segment 2112. In the radial direction Y, the convex portion 232 may be in contact with one of the sealing member 220 and the hole wall of the second hole segment 2112, or of course, may also be arranged to be apart from each other, so as to restrict the gas-ventilating member 230 moving in the radial direction Y of the second hole segment 2112.

The fixing member 240 may partially cover the gas-ventilating film 230 and be connected to the wall portion 210 of the casing. The pressure provided to the gas-ventilating film 230 may be a force in the axial direction of the gas-ventilating hole, so as to prevent the gas-ventilating film 230 from being separated from the sealing member 220 and ensure the sealing performance.

The fixing member 240 can be made of a metal material, so as to be connected with the wall portion 210 by welding. The fixing member 240 is provided with an opening for discharging the gas flowing via the gas-ventilating film 230.

In the technical solution of an embodiment of the present application, the stepped hole 211 can be formed on the wall portion 210, the stepped hole 211 may include the first hole segment 2111 arranged close to the electrode assembly 23, the second hole segment 2112 and the stepped face 2113 connecting to the first hole segment 2111 and the second hole segment 2112, the first hole segment 2111 and the first stepped face 2113 can be configured to accommodate at least a part of the sealing member 220, the first sealing interface 250 can be formed between the sealing member 220 and the first stepped face 2113, and the first sealing interface 250 can be arranged around the first hole segment 2111, so that it can ensure the sealing performance between the sealing member 220 and the wall portion 210. The ventilating hole 221 communicated with the first hole segment 2111 provided on the sealing member 220 can guide the gas at an inside of the battery cell 20 to the inside of the stepped hole 211, so as to discharge the gas to an outside of the casing.

The gas-ventilating film 230 may include the body 231 and the convex portion 232, and the body 231 covers the ventilating hole 221, so that the gas entering through the ventilating hole 221 can be discharged to the outside of the battery cell 20 via the gas-ventilating film 230, the gas-ventilating film 230 can block the leakage of an electrolyte, and at the same time it can prevent external water vapor from entering the battery cell 20 and affecting the performance of the battery cell 20. The second sealing interface 260 can be formed between the body 231 and the sealing member 220, and the second sealing interface 260 can surround the ventilating hole 221. According to the above arrangement, the gas-exhausting effect can be ensured, and at the same time, it can prevent the electrolyte from entering the outside of the body 231 through a bonding region between the sealing member 220 and the body 231, which may cause the gas-ventilating film 230 to be soaked and swelled. The convex portion 232 can be arranged correspondingly. Since the convex portion 232 can be arranged at the side of the body 231 facing the sealing member 220, the convex portion 232 can be located between the hole wall of the second hole segment 2112 and the sealing member 220, so as to restrict gas-ventilating film 230 moving in the radial direction Y of the second hole segment 2112. In other words, since the convex portion 232 connected with the body 231 can be arranged between the hole wall of the second hole segment 2112 and the sealing member 220, when the body 231 moves in the radial direction Y, the body 231 will drive the convex portion 232 to move. The convex portion 232 can be located between the hole wall of the second hole segment 2112 and the sealing member 220. When the convex portion 232 moves in the radial direction Y, the convex portion 232 will provide the position restriction, so as to restrain the convex portion 232 from moving and restrain the body 231 from moving in the radial direction Y, so that it can prevent the gas-ventilating film 230 from bias moving during assembled or from moving in the radial direction Y when subjected to a large gas pressure deformation. The fixing member 240 which is arranged correspondingly can press and hold the gas-ventilating film 230 to maintain the sealing performance of the first sealing interface 250 and the second sealing interface 260, can provide the gas-ventilating film 230 with an acting force opposite to an effect direction of the gas pressure of the inside of the battery cell 20, can suppress the deformation of the gas-ventilating film 230, and can improve the safety performance of the battery cell 20 at the same time.

Optionally, the sealing member 220 may include a first sealing body 222 and a second sealing body 223 that are arranged to be apart from each other in the radial direction Y of the ventilating hole 221, and a sealing connecting body 224 that is connected between the first sealing body 222 and the second sealing body 223. The first sealing body 222, the second sealing body 223 and the sealing connecting body 224 are flush at a side facing the gas-ventilating film in the thickness direction X and are in contact with the gas-ventilating film. The ventilating hole 221 is formed in the first sealing body 222, and the first sealing body 222 may be at least partially located in the first hole segment 2111. The second sealing body 223 and the sealing connecting body 224 can be located in the second hole segment 2112, and each of the second sealing body 223 and the sealing connecting body 224 is in contact with the first stepped surface 2113 and the a gas-ventilating film 230 to form the first sealing interface 250 and the second sealing interface 260. According to the above arrangement, the sealing performance can be effectively guaranteed.

Figure 8:
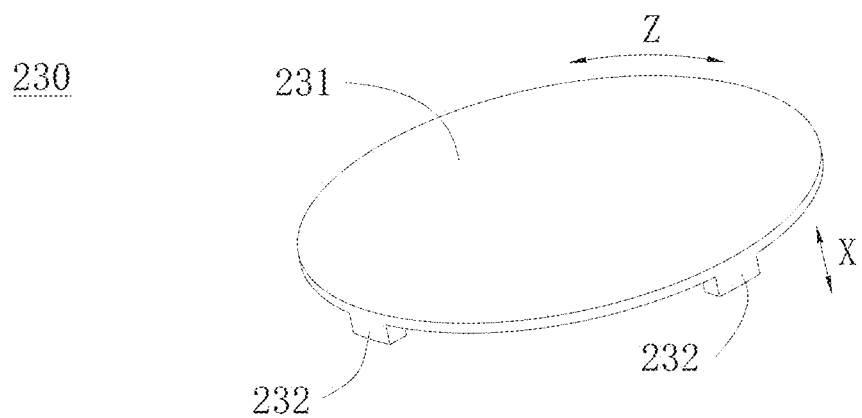
FIG. 8 shows a structural schematic view of a gas-ventilating film according to some embodiments of the present application.

Referring to FIG. 8, FIG. 8 shows a structural schematic view of the gas-ventilating film 230 according to some embodiments of the present application. In some embodiments, two or more convex portions 232 are arranged to be apart from one another in the circumferential direction Z of the second hole segment 2112.

The number of convex portions 232 is not specifically limited, and may be two, three or even more, and specifically may be determined according to the requirements of the size of the body 231 and the size of each the convex portion 232.

The convex portion 232 can adopt various shapes, for example, the convex portion 232 can be of a cylinder, a prism, an arc-shaped structure or the like.

The number of convex portions 232 may be multiple and arranged to be apart from one another in the circumferential direction of the second hole segment 2112, so that it can ensure that the position restriction can be provided in a plurality of directions and reduce the probability of the gas-ventilating film 230 moving in the radial direction Y of the second hole segment 2112.

In some embodiments, two or more convex portion 232 are uniformly distributed in the circumferential direction Z. In other words, two or more convex portions 232 are uniformly arranged in the circumferential direction Z. Included angles between two adjacent convex portions 232 are the same. Taking four convex portions 232 as an example, the included angles between two adjacent convex portions 232 are 90°.

Two or more convex portions 232 are uniformly arranged in the circumferential direction Z, so that the gas-ventilating film 230 can be positioningly restricted and uniformly stressed at all places in the circumferential direction Z when the battery cell 20 is assembled and formed and when the gas pressure of the inside of the battery cell 20 is too high, so as to avoid the gas-ventilating film 230 from moving in the radial direction Y due to uneven forces.

It can be understood that the number of the convex portions 232 determined to be two or more and the arrangement of the convex portions 232 spaced apart from one another in the circumferential direction Z are merely in an optional embodiment, but are not restricted to the above number or arrangement.

Figure 9:
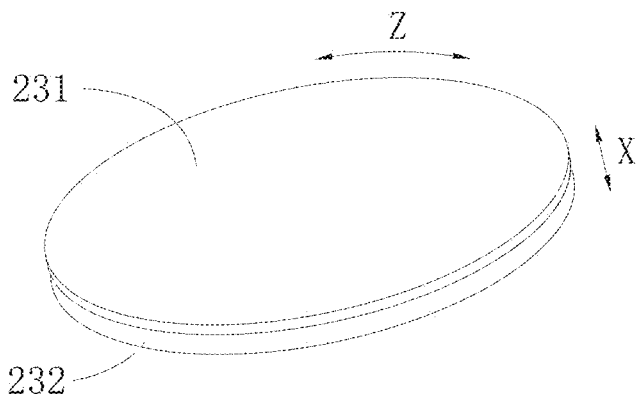
FIG. 9 shows a structural schematic view of a gas-ventilating film according to some other embodiments of the present application.

Referring to FIG. 9, FIG. 9 shows a structural schematic view of the gas-ventilating film 230 according to some other embodiments of the present application. In some other embodiments, the convex portion 232 can be an annular structure continuously extending in a circumferential direction Z of the second hole segment 2112. According to the above arrangement, the restriction of movement in the radial direction Y can also be satisfied.

Continuously referring to FIG. 3 to FIG. 9, in some optional embodiments, the body 231 may be a sheet structure with a uniform thickness. The uniform thickness can be understood as that in the thickness direction X of the wall portion 210 or in the axial direction of the ventilating hole 221, the thicknesses of the body 231 are equal or approximately equal. According to the above arrangement, the gas-ventilating performance of the body 231 can be ensured, and at the same time, the gas-ventilating performance of all parts of the body 231 can be ensured to be consistent, so as to avoid deformation problems caused by the uneven forces.

Optionally, the thickness of the body 231 can be any value between 0.1 mm-0.2 mm, including two end values of 0.1 mm and 0.2 mm. According to the above arrangement, the gas-ventilating film 230 can be thin enough to ensure the gas-ventilating rate, and the overall size of the gas-ventilating film 230 in the radial direction Y becomes smaller, so as to save the occupied space of the gas-ventilating film 230 on the wall 210.

In some embodiments, in the battery cell provided by the embodiments of the present application, a first gap 270 can be formed between the convex portion 232 and the first stepped face 2113 in the thickness direction X. According to the above arrangement, the processing error generated during the processing of the gas-ventilating film 230 can be compensated, and the requirements of positioning and assembly can be met. The thickness direction X can also be understood as the axial direction of the ventilating hole 221.

As an optional embodiment, in the battery cell provided in the embodiments of the present application, in the radial direction Y of the ventilating hole 221, a second gap 280 is formed between the convex portion 232 and the sealing member 220 in the radial direction Y of the second hole segment 2112. It means that the convex portion 232 is arranged to be spaced apart from the sealing member 220 in the radial direction Y. According to the above arrangement, it can be ensured that the sealing member 220 has a sufficient compression space, so as to ensure the sealing performance of the first sealing interface 250.

In some optional embodiments, a size of the second gap 280 may be 0.3 mm-0.4 mm. According to the above arrangement, it can ensure that the sealing member 220 has enough compression space, and at the same time, it can avoid affecting the overall position-restricting effect of the convex portion 232 on the gas-ventilating film 230 due to the excessively large gap, so that it can prevent the gas-ventilating film 230 from moving in the radial direction Y.

In some embodiments, an outer surface of the convex portion 232 facing an inner wall of the second hole segment 2112 is a sloping face in the radial direction Y, and a distance between the outer surface and the inner wall in the radial direction Y gradually increases from a side of the outer surface of the convex portion 232 facing to the inner wall of the second hole segment 2112 away from the sealing member 220 to a side at which the sealing member 220 is located. According to the above arrangement, not only is it beneficial for assembly and positioning when the battery cell 20 is assembled and formed, but also the conical arrangement of the outer surface of the convex portion 232 facing the inner wall of the second hole segment 2112 facilitates the convex portion 232 inserted and engaged between the inner wall of the second hole segment 2112 and the sealing member 220, so as to ensure the assembly efficiency.

In some embodiments, the body 231 and the convex portion 232 are of an integrally formed structure. It means that the body 231 and the convex portion 232 can be formed simultaneously by the same process. It can not only improve the production efficiency of the gas-ventilating film 230, but also ensure the connection strength between the convex portion 232 and the body 231.

In some embodiments, the gas-ventilating film 230 is entirely accommodated in the second hole segment 2112. It means that, in the thickness direction X of the wall portion 210, or in other words, in the axial direction of the ventilating hole 221, the gas-ventilating film 230 does not protrude from the second hole segment 2112. According to the above arrangement, it can ensure the pressure provided by the fixing member 240 to the gas-ventilating film 230, and ensure the sealing performance of the first sealing interface 250 and the second sealing interface 260. At the same time, at least part of a surface of the fixing member 240 facing the gas-ventilating film 230 can be pressed against the wall portion 210, so as to facilitate the connection and positioning between the fixing member 240 and the casing.

As an optional embodiment, the first sealing interface 250 at least partially overlaps with the second sealing interface 260 in the thickness direction X. It means that, in the thickness direction X of the wall portion 210 or in the axial direction of the ventilating hole 221, the orthographic projection of the first sealing interface 250 and the orthographic projection of the second sealing interface 260 may at least partially overlap with each other, or of course may completely overlap with each other. According to the above arrangement, the sealing performance of the first sealing interface 250 and the second sealing interface 260 can be ensured, so that the sealing performance of the battery cell 20 can be good and the safety performance can be high.

In some embodiments, the gas-ventilating film 230 is configured to activate to open the ventilating hole and release an internal pressure of the battery cell 20 when the internal pressure or a temperature of the battery cell 20 reaches a threshold value. In other words, the ventilating hole 221 can be communicated with the outside of the battery cell 20 when the pressure or temperature of the inside of the battery cell 20 reaches the threshold value, so as to exhaust the gas at the inside of the battery cell 20 to the outside of the battery cell 20, thereby avoiding the risk of damage to the battery cell 20 or even explosion caused by the pressure or temperature of inside of the battery cell 20 being too high.

In some embodiments, the gas-ventilating film 230 may include a polymer material. According to the above arrangement, it is beneficial to form the body 231 and the convex portion 232, and at the same time it can ensure the gas-ventilating performance and the water-resisting performance.

Continuously referring to FIG. 3 to FIG. 9, in some optional embodiments, the stepped hole 211 further includes a third hole segment 2114 and a second stepped face 2115, the second hole segment 2112 can be located between the third hole segment 2114 and the first hole segment 2111, at least a part of the fixing member 240 is accommodated in the third hole segment 2114, and a part of the fixing member 240 exceeding the hole wall of the second hole segment 2112 is pressed against the second stepped face 2115. According to arranging the third hole segment 2114 and the second stepped face 2115 and defining the position and matching relationship among the third hole segment 2114, the second stepped face 2115 and the fixing member 240, it is beneficial to the positioning assembly of the fixing member 240 and the connection between the fixing member 240 and the casing. At the same time, it can reduce the space of a module occupied by the fixing member 240, so that it is beneficial to improve the energy density of the battery cell 20.

In some embodiments, the fixing member 240 is integrally accommodated in the third hole segment 2114. It means that, in the thickness direction X of the wall portion 210 or in the axial direction of the ventilating hole 221, the fixing member 240 does not protrude from the third hole segment 2114. According to the above arrangement, it can ensure non-interference with the module structure, therefore the space of the module is not occupied, and it is beneficial to improve the energy density.

In some optional embodiments, the casing body 22 may include a wall portion 210, or the cover assembly 21 may include the wall portion 210. When the cover assembly includes the wall portion 210, the cover assembly can be used as a part of the battery cell, or can be produced and sold as an independent component.

Figure 10:
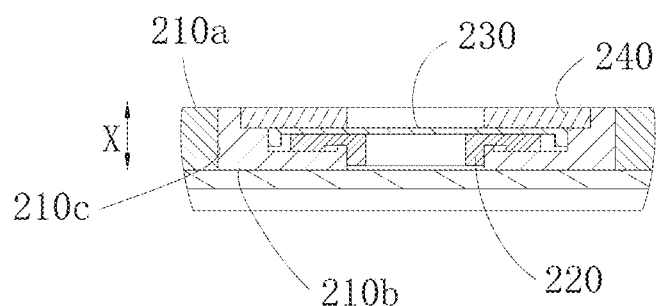
FIG. 10 shows a partial structural schematic view of a battery cell in some other embodiments of the present application.

Referring to FIG. 10, FIG. 10 shows a partial structural schematic view of the battery cell in some other embodiments of the present application. In some embodiments, the wall portion 210 may include a base body 210a and a connecting member 210b, the base body 210a may include a through hole 210c penetrating in the thickness direction X, the connecting member 210b may be accommodated in the through hole 210c and connected to the base body 210a, the connecting member 210b may include the stepped hole 211, and each of the sealing member 220, the gas-ventilating film 230 and the fixing member 240 can be arranged on the connecting member 210b. The wall portion 210 may include the base body 210a and the connecting member 210b, so that it is beneficial that the sealing member 220, the gas-ventilating film 230 and the fixing member 240 are connected with the base body 210a after integrally assembled with the connecting member 210b. Another forming and assembly process can be provided, which can also meet the performance requirements of the battery cell.

Figure 11:
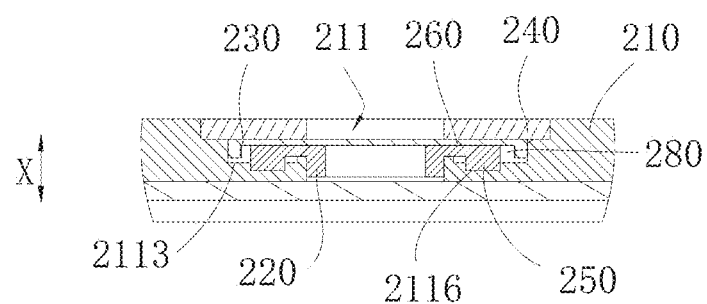
FIG. 11 shows a partial structural schematic view of a battery cell in some other embodiments of the present application.

Referring to FIG. 11, FIG. 11 shows a partial structural schematic view of the battery cell in some other embodiments of the present application. In some embodiments, the wall portion 210 can be provided with a position-restricting groove 2116 engaged with the sealing member 220, the position-restricting groove 2116 can be formed by concaving from the first stepped face 2113 towards a direction facing away from the gas-ventilating film 230, and the sealing member 220 at least partly extends into the position-restricting groove 2116 and engages with the position-restricting groove 2116.

A shape of a part of the sealing member 220 inserted into the position-restricting groove 2116 matches and engages with a shape of the position-restricting groove 2116. According to the above arrangement, a relative position between the sealing member 220 and the wall portion 210 can be restricted to prevent the sealing member 220 from moving in the radial direction Y, thereby further ensuring the sealing performance, and at the same time reducing the probability of the gas-ventilating film 230 moving in the radial direction Y.

In another aspect, the battery provided by the present application may include the battery cell according to the above embodiments. The battery can be configured to provide an electric energy.

In another aspect, an electricity-consuming apparatus provided by the present application includes the battery as described above.

Figure 12:
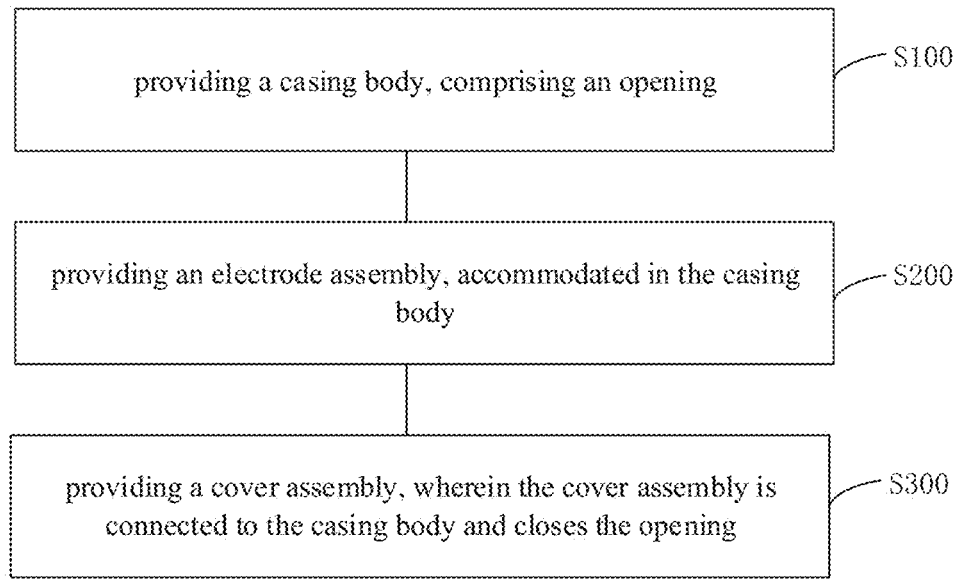
FIG. 12 shows a flow chart of a method of manufacturing a battery cell according to some embodiments of the present application.

Referring to FIG. 12, FIG. 12 shows a flow chart of a method of manufacturing the battery cell according to some embodiments of the present application. In another aspect, a method of manufacturing the battery cell is further provided by the present application, which can be used to manufacture the battery cell provided in the embodiments as described above. The method may include:

S100: providing a casing body 22, including an opening;
S200: providing an electrode assembly 23 and installing the electrode assembly 23 into the casing body 22; and
S300: providing a cover assembly 21, in which the cover assembly 21 is connected to the casing body 22 and closes the opening, and the cover assembly 21 includes: a cover plate 21b, including a wall portion 210, in which the wall portion 210 includes a stepped hole 211 penetrating through the wall portion 210 in a thickness direction X, the stepped hole 211 includes a first hole segment 2111, a second hole segment 2112 and a first stepped face 2113, the first hole segment 2111 is closer to the electrode assembly 23 of the battery cell 20 than the second hole segment 2112, and the first stepped face 2113 is configured to connect a hole wall of the first hole segment 2111 and a hole wall of the second hole segment 2112; a sealing member 220, in which a first sealing interface 250 is formed between the sealing member 220 and the first stepped face 2113, the first sealing interface 250 surrounds the first hole segment 2111, and the sealing member 220 includes a ventilating hole 221 communicating with the first hole segment 2111; a gas-ventilating film 230, including a body 231 and a convex portion 232, in which the body 231 covers the ventilating hole 221, a second sealing interface 260 is formed between the body 231 and the sealing member 220, the second sealing interface 260 surrounds the ventilating hole 221, the convex portion 232 is arranged at a side of the body 231 facing the sealing member 220, and the convex portion 232 is located between the hole wall of the second hole segment 2112 and the sealing member 220 to restrict the gas-ventilating film 230 moving in a radial direction Y of the second hole segment 2112; and a fixing member 240, connected to the wall portion 210 and configured to provide a pressure to the gas-ventilating film 230.

The method of manufacturing the battery cell provided by the embodiments of the present application can be used to manufacture the battery cell 20 provided by the above-mentioned embodiments. In the battery cell that is manufactured, the gas-ventilating film 230 may include the convex portion 232. Since the convex portion 232 can be arranged at the side of the body 231 facing the sealing member 220, the convex portion 232 can be located between the hole wall of the second hole segment 2112 and the sealing member 220, so as to restrict gas-ventilating film 230 moving in the radial direction Y of the second hole segment 2112. In other words, since the convex portion 232 connected with the body 231 can be arranged between the hole wall of the second hole segment 2112 and the sealing member 220, when the body 231 moves in the radial direction Y, the body 231 will drive the convex portion 232 to move. The convex portion 232 can be located between the hole wall of the second hole segment 2112 and the sealing member 220. When the convex portion 232 moves in the radial direction Y, the convex portion 232 will provide the position restriction, so as to restrain the convex portion 232 from moving and restrain the body 231 from moving in the radial direction Y, so that it can prevent the gas-ventilating film 230 from bias moving during assembled or from moving in the radial direction Y when subjected to a large gas pressure deformation. The fixing member 240 which is arranged correspondingly can press and hold the gas-ventilating film 230 to maintain the sealing performance of the first sealing interface 250 and the second sealing interface 260, can provide the gas-ventilating film 230 with an acting force opposite to an effect direction of the gas pressure of the inside of the battery cell 20, can suppress the deformation of the gas-ventilating film 230, and can improve the safety performance of the battery cell 20 at the same time.

Figure 13:
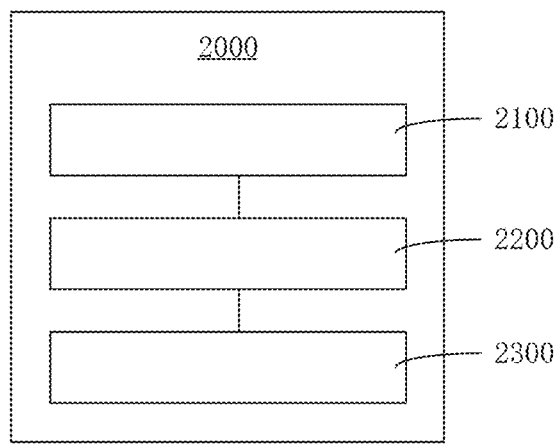
FIG. 13 shows a structural schematic view of a device of manufacturing a battery cell according to some embodiments of the present application.

Referring to FIG. 13, FIG. 13 shows a structural schematic view of a device of manufacturing the battery cell according to some embodiments of the present application. In another aspect, a device 2000 of manufacturing a battery cell provided by the present application can be used to manufacture the battery cell 20 provided by the above-mentioned embodiments. The device includes:
- a first assembly apparatus 2100, configured to provide a casing body 22 including an opening;
- a second assembly apparatus 2200, configured to provide an electrode assembly 23 and install the electrode assembly 23 into the casing body 22; and
- a third assembly apparatus 2300, configured to provide a cover assembly 21, in which the cover assembly 21 is connected to the casing body 22 and closes the opening, and the cover assembly 21 includes: a cover plate 21b, including a wall portion 210, in which the wall portion 210 includes a stepped hole 211 penetrating through the wall portion 210 in a thickness direction X, the stepped hole 211 includes a first hole segment 2111, a second hole segment 2112 and a first stepped face 2113, the first hole segment 2111 is closer to the electrode assembly 23 of the battery cell than the second hole segment 2112, and the first stepped face 2113 is configured to connect a hole wall of the first hole segment 2111 and a hole wall of the second hole segment 2112; a sealing member 220, in which a first sealing interface 250 is formed between the sealing member 220 and the first stepped face 2113, the first sealing interface 250 surrounds the first hole segment 2111, and the sealing member 220 includes a ventilating hole 221 communicating with the first hole segment 2111; a gas-ventilating film 230, including a body 231 and a convex portion 232, in which the body 231 covers the ventilating hole 221, a second sealing interface 260 is formed between the body 231 and the sealing member 220, the second sealing interface 260 surrounds the ventilating hole 221, the convex portion 232 is arranged at a side of the body 231 facing the sealing member 220, and the convex portion 232 is located between the hole wall of the second hole segment 2112 and the sealing member 220 to restrict the gas-ventilating film 230 moving in a radial direction Y of the second hole segment 2112; and a fixing member 240, connected to the wall portion 210 and configured to provide a pressure to the gas-ventilating film 230.

The device of manufacturing the battery cell provided by the embodiments of the present application can be used to manufacture the battery cell 20 provided by the above-mentioned embodiments. In the battery cell that is manufactured, the gas-ventilating film 230 may include the convex portion 232. Since the convex portion 232 can be arranged at the side of the body 231 facing the sealing member 220, the convex portion 232 can be located between the hole wall of the second hole segment 2112 and the sealing member 220, so as to restrict gas-ventilating film 230 moving in the radial direction Y of the second hole segment 2112. In other words, since the convex portion 232 connected with the body 231 can be arranged between the hole wall of the second hole segment 2112 and the sealing member 220, when the body 231 moves in the radial direction Y, the body 231 will drive the convex portion 232 to move. The convex portion 232 can be located between the hole wall of the second hole segment 2112 and the sealing member 220. When the convex portion 232 moves in the radial direction Y, the convex portion 232 will provide the position restriction, so as to restrain the convex portion 232 from moving and restrain the body 231 from moving in the radial direction Y, so that it can prevent the gas-ventilating film 230 from bias moving during assembled or from moving in the radial direction Y when subjected to a large gas pressure deformation. The fixing member 240 which is arranged correspondingly can press and hold the gas-ventilating film 230 to maintain the sealing performance of the first sealing interface 250 and the second sealing interface 260, can provide the gas-ventilating film 230 with an acting force opposite to an effect direction of the gas pressure of the inside of the battery cell 20, can suppress the deformation of the gas-ventilating film 230, and can improve the safety performance of the battery cell 20 at the same time.

Although the application has been described with reference to the preferred embodiments, various modifications may be made and equivalents may be substituted for elements thereof without departing from the scope of the present application. In particular, as long as there is no structural conflict, the technical features mentioned in the various embodiments can be combined in any manner. The present application is not restrict to the specific embodiments disclosed herein, but includes all technical solutions falling within the scope of the claims.

What is claimed is:

1. A battery cell, comprising:
an electrode assembly,
a casing, configured to accommodate the electrode assembly, wherein the casing comprises a wall portion, the wall portion comprises a stepped hole, the stepped hole penetrates through the wall portion in a thickness direction, the stepped hole comprises a first hole segment, a second hole segment and a first stepped face, the first hole segment is closer to the electrode assembly than the second hole segment, and the first stepped face is configured to connect a hole wall of the first hole segment and a hole wall of the second hole segment;
a sealer, wherein a first sealing interface is formed between the sealer and the first stepped face, the first sealing interface surrounds the first hole segment, and the sealer comprises a ventilating hole communicating with the first hole segment;

a gas-ventilating film, comprising a body and a convex portion, wherein the body covers the ventilating hole, a second sealing interface is formed between the body and the sealer, the second sealing interface surrounds the ventilating hole, the convex portion is arranged at a side of the body facing the sealer, and the convex portion protrudes from the body in the thickness direction into an empty region between the hole wall of the second hole segment and a side surface of the sealer to restrict the gas-ventilating film moving in a radial direction of the second hole segment; and a fixer, connected to the wall portion and configured to provide a pressure to the gas-ventilating film, wherein a first gap is formed in the empty region between the convex portion and the first stepped face in the thickness direction.

2. The battery cell according to claim 1, wherein two or more convex portions are arranged to be apart from one another in a circumferential direction of the second hole segment, and the two or more convex portions are uniformly distributed in the circumferential direction.

3. The battery cell according to claim 1, wherein the convex portion is an annular structure continuously extending in a circumferential direction of the second hole segment.

4. The battery cell according to claim 1, wherein the body is a sheet structure with a uniform thickness.

5. The battery cell according to claim 1, wherein in the radial direction, a second gap is formed between the convex portion and the sealer in the radial direction of the second hole segment.

6. The battery cell according to claim 1, wherein an outer surface of the convex portion facing an inner wall of the second hole segment is a sloping face in the radial direction, and a distance between the outer surface and the inner wall in the radial direction gradually increases from a side of the outer surface away from the sealer to a side at which the sealer is located.

7. The battery cell according to claim 1, wherein the body and the convex portion are of an integrally formed structure.

8. The battery cell according to claim 1, wherein the gas-ventilating film is entirely accommodated in the second hole segment.

9. The battery cell according to claim 1, wherein the first sealing interface at least partially overlaps with the second sealing interface in the thickness direction.

10. The battery cell according to claim 1, wherein the gas-ventilating film is configured to activate to open the ventilating hole and release an internal pressure of the battery cell when the internal pressure or a temperature of the battery cell reaches a threshold value.

11. The battery cell according to claim 1, wherein the gas-ventilating film comprises a polymer material.

12. The battery cell according to claim 1, wherein the stepped hole further comprises a third hole segment and a second stepped face, the second hole segment is located between the third hole segment and the first hole segment, at least a part of the fixer is accommodated in the third hole segment, a part of the fixer exceeding the hole wall of the second hole segment is pressed against the second stepped face, and the fixer is integrally accommodated in the third hole segment.

13. The battery cell according to claim 1, wherein the casing comprises a casing body and a cover assembly, the casing body comprises an opening, the electrode assembly is arranged in the casing body, the cover assembly closes the opening, and one of the casing body or the cover assembly comprises the wall portion.

14. The battery cell according to claim 1, wherein the wall portion comprises a base body and a connector, the base body comprises a through hole penetrating in the thickness direction, the connector is accommodated in the through hole and connected to the base body, the connector comprises the stepped hole, and each of the sealer, the gas-ventilating film and the fixer is arranged on the connector.

15. The battery cell according to claim 1, wherein the wall portion is provided with a position-restricting groove engaged with the sealer, the position-restricting groove is formed by concaving from the first stepped face towards a direction facing away from the gas-ventilating film, and the sealer at least partly extends into the position-restricting groove and engages with the position-restricting groove.

16. A cover assembly for a battery cell, comprising:

a cover plate, comprising a wall portion, wherein the wall portion comprises a stepped hole penetrating through the wall portion in a thickness direction, the stepped hole comprises a first hole segment, a second hole segment and a first stepped face, the first hole segment is closer to the electrode assembly of the battery cell than the second hole segment, and the first stepped face is configured to connect a hole wall of the first hole segment and a hole wall of the second hole segment;

a sealer, wherein a first sealing interface is formed between the sealer and the first stepped face, the first sealing interface surrounds the first hole segment, and the sealer comprises a ventilating hole communicating with the first hole segment;

a gas-ventilating film, comprising a body and a convex portion, wherein the body covers the ventilating hole, a second sealing interface is formed between the body and the sealer, the second sealing interface surrounds the ventilating hole, the convex portion is arranged at a side of the body facing the sealer, and the convex portion protrudes from the body in the thickness direction into an empty region between the hole wall of the second hole segment and a side surface of the sealer to restrict the gas-ventilating film moving in a radial direction of the second hole segment; and a fixer, connected to the wall portion and configured to provide a pressure to the gas-ventilating film, wherein a first gap is formed in the empty region between the convex portion and the first stepped face in the thickness direction.

17. A battery, comprising the battery cell according to claim 1, wherein the battery is configured to provide an electric power.

18. An electricity-consuming apparatus, comprising the battery according to claim 17.

* * * * *